(12) United States Patent
Schmidt et al.

(10) Patent No.: US 7,647,177 B2
(45) Date of Patent: *Jan. 12, 2010

(54) SYSTEM AND METHOD FOR DETERMINING A POSITION OF A VEHICLE

(75) Inventors: Mark Alvin Schmidt, Charlotte, NC (US); Kenneth Edward Hunt, Rock Hill, SC (US); David Roy Holm, Oconomowoc, WI (US); Scott Adam Stephens, Phoenix, AZ (US)

(73) Assignee: Deere & Company, Moline, IL (US)

( * ) Notice: Subject to any disclaimer, the term of this patent is extended or adjusted under 35 U.S.C. 154(b) by 812 days.

This patent is subject to a terminal disclaimer.

(21) Appl. No.: 11/208,337

(22) Filed: Aug. 19, 2005

(65) Prior Publication Data

US 2006/0224308 A1    Oct. 5, 2006

Related U.S. Application Data

(60) Provisional application No. 60/667,154, filed on Mar. 31, 2005.

(51) Int. Cl.
    *G01S 5/06* (2006.01)
    *G01S 1/00* (2006.01)
(52) U.S. Cl. ....................... 701/300; 342/451
(58) Field of Classification Search .......... None
    See application file for complete search history.

(56) References Cited

U.S. PATENT DOCUMENTS 3,659,085 A    4/1972  Potter et al.

(Continued)

FOREIGN PATENT DOCUMENTS

CA    1271546    7/1990

(Continued)

OTHER PUBLICATIONS

H. Edelsbruneer and T.S. Tan, *Quadratic Time Algorithm for the Minmax Length Triangulation*, Proceedings of the 32$^{nd}$ Annual Symposium on Foundations of Computer Science, pp. 414-423, 1991, San Juan Puerto Rico.

(Continued)

*Primary Examiner*—Michael J. Zanelli
(74) *Attorney, Agent, or Firm*—Yee & Associates, P.C.; Marilyn Smith Dawkins

(57) ABSTRACT

A time estimator determines a first aggregate elapsed time between the transmission of the first transmission signal to a first beacon and receipt of a return signal, a second aggregate elapsed time between the transmission of the first transmission signal to a second beacon and receipt of a return signal, and a third aggregate elapsed time between the transmission of the first transmission signal to a third beacon and receipt of a return signal. A bias compensator compensates for bias delay associated with at least one of the first transmitter, the first beacon, the second beacon and the third beacon. A converter converts the first aggregate elapsed time, the second aggregate elapsed time, and the third aggregate elapsed time into position curves. A data processor estimates a position of the vehicle at a confluence or intersection of the position curves.

18 Claims, 12 Drawing Sheets

U.S. PATENT DOCUMENTS

| | | | |
|---|---|---|---|
| 4,706,120 A | 11/1987 | Slaughter et al. | |
| 4,710,020 A | 12/1987 | Maddox et al. | |
| 4,829,442 A | 5/1989 | Kadonoff et al. | |
| 4,833,480 A | 5/1989 | Palmer et al. | |
| 4,873,449 A | 10/1989 | Paramythioti et al. | |
| 5,045,861 A | 9/1991 | Duffett-Smith | |
| 5,307,271 A | 4/1994 | Everett, Jr. et al. | |
| 5,334,986 A | 8/1994 | Fernhout | |
| 5,375,059 A | 12/1994 | Kyrtsos et al. | |
| 5,390,125 A | 2/1995 | Sennott et al. | |
| 5,438,517 A | 8/1995 | Sennott et al. | |
| 5,491,476 A | 2/1996 | DiBella | |
| 5,491,670 A * | 2/1996 | Weber | 367/127 |
| 5,610,815 A | 3/1997 | Gudat et al. | |
| 5,640,323 A | 6/1997 | Kleimenhagen et al. | |
| 5,657,226 A | 8/1997 | Shin et al. | |
| 5,657,317 A | 8/1997 | Mahany et al. | |
| 5,681,670 A | 10/1997 | Kobayashi | |
| 5,682,313 A | 10/1997 | Edlund et al. | |
| 5,810,105 A | 9/1998 | Trainer | |
| 5,874,918 A | 2/1999 | Czarnecki et al. | |
| 5,933,079 A | 8/1999 | Frink | |
| 5,940,346 A * | 8/1999 | Sadowsky et al. | 367/128 |
| 5,974,347 A | 10/1999 | Nelson | 701/22 |
| 5,982,164 A | 11/1999 | Czarnecki et al. | |
| 5,986,602 A | 11/1999 | Frink | |
| 6,011,974 A | 1/2000 | Cedervall et al. | |
| 6,057,800 A | 5/2000 | Yang et al. | |
| 6,070,121 A | 5/2000 | Matsuda | |
| 6,072,421 A | 6/2000 | Fukae et al. | |
| 6,107,959 A | 8/2000 | Levanon | |
| 6,125,135 A | 9/2000 | Woo et al. | |
| 6,212,448 B1 | 4/2001 | Xydis | |
| 6,327,534 B1 | 12/2001 | Levanon et al. | |
| 6,369,754 B1 | 4/2002 | Levanon | |
| 6,407,703 B1 | 6/2002 | Minter et al. | |
| 6,420,862 B2 | 7/2002 | Medelius et al. | |
| 6,420,999 B1 | 7/2002 | Vayanos | |
| 6,424,264 B1 | 7/2002 | Giraldin et al. | |
| 6,427,079 B1 | 7/2002 | Schneider et al. | |
| 6,459,966 B2 | 10/2002 | Nakano et al. | |
| 6,489,917 B2 | 12/2002 | Geisheimer et al. | |
| 6,556,942 B1 | 4/2003 | Smith | |
| 6,560,536 B1 | 5/2003 | Sullivan et al. | |
| 6,614,721 B2 | 9/2003 | Bokhour | |
| 6,640,154 B2 | 10/2003 | Breuer | |
| 6,798,376 B2 | 9/2004 | Shioda et al. | |
| 6,861,979 B1 | 3/2005 | Zhodzishsky et al. | |
| 7,026,992 B1 | 4/2006 | Hunt et al. | |
| 7,110,880 B2 | 9/2006 | Breed et al. | |
| 7,349,746 B2 | 3/2008 | Emigholz et al. | |
| 7,555,379 B2 | 6/2009 | Endo et al. | |
| 2001/0020214 A1 | 9/2001 | Brenner | |
| 2001/0022506 A1 | 9/2001 | Peless et al. | |
| 2001/0027360 A1 | 10/2001 | Nakano et al. | |
| 2001/0051527 A1 | 12/2001 | Kuwahara et al. | |
| 2002/0050944 A1 | 5/2002 | Sheynblat et al. | |
| 2002/0097181 A1 | 7/2002 | Chou et al. | |
| 2002/0175854 A1 | 11/2002 | Shioda et al. | |
| 2003/0005030 A1 | 1/2003 | Sutton et al. | |
| 2003/0007473 A1 | 1/2003 | Strong et al. | |
| 2003/0142587 A1 | 7/2003 | Zeitzew | |
| 2004/0032363 A1 | 2/2004 | Schantz et al. | |
| 2005/0002481 A1 | 1/2005 | Woo et al. | |
| 2005/0035897 A1 | 2/2005 | Perl et al. | |
| 2005/0136845 A1 | 6/2005 | Masuoka et al. | |
| 2005/0137786 A1 | 6/2005 | Breed et al. | |
| 2005/0192024 A1 | 9/2005 | Sheynblat | |
| 2006/0014548 A1 | 1/2006 | Bolin et al. | |
| 2006/0050625 A1 | 3/2006 | Krasner | |
| 2006/0058898 A1 | 3/2006 | Emigholz et al. | |
| 2006/0150584 A1 | 7/2006 | Weiss | |
| 2007/0198152 A1 | 8/2007 | Endo et al. | |
| 2008/0204322 A1 | 8/2008 | Oswald et al. | |

FOREIGN PATENT DOCUMENTS

| | | |
|---|---|---|
| EP | 0732641 | 9/1999 |
| EP | 1251362 | 10/2002 |
| JP | 8068652 A | 3/1996 |
| JP | 10325730 A | 12/1998 |
| JP | 2005041276 A | 2/2005 |
| WO | 98/34124 | 8/1998 |
| WO | 03/101178 | 12/2003 |

OTHER PUBLICATIONS

F. van Diggelen and A. Brown, *Mathematical Aspects of GPS Raim*, IEEE Position Location and Navigation Symposium, pp. 733-738, 1994, Las Vegas, NV, USA.

Jwo, D. J. Optimisation and sensitivity analysis of GPS receiver tracking loops in dynamic environments. IEE Proc.—Radar. Sonar Navig. , vol. 148, No. 4, Aug. 2001. IEE Proceedings online No. 20010429.

USPTO Notice of Allowance for U.S. Appl. 11/208,485 dated Sep. 29, 2009.

\* cited by examiner

US 7,647,177 B2

SYSTEM AND METHOD FOR DETERMINING A POSITION OF A VEHICLE

This document claims priority based on U.S. provisional application Ser. No. 60/667,154, filed Mar. 31, 2005, and entitled SYSTEM AND METHOD FOR DETERMINING A POSITION OF A VEHICLE, under 35 U.S.C. 119(e).

FIELD OF THE INVENTION

This invention relates to a system and method for determining a position of a vehicle.

BACKGROUND OF THE INVENTION

Noise or transient signals may degrade the performance of a system for determining a position of a vehicle. The noise may cause inaccuracy in the estimated position of the vehicle. Thus, there is a need for compensation to compensate for the noise and transient signals or interference to improve the accuracy of the estimated position of the vehicle.

The delay associated with electronic circuitry and processing may vary from one device, module, or transceiver to another. Applying a fixed delay allowance for the electronic circuitry and processing may degrade the performance of the system for determining a position of a vehicle. Accordingly, there is need for providing a variable delay allowance consistent with the variations found between similar devices, modules, or transceivers.

SUMMARY OF THE INVENTION

A method and system for determining the position of a vehicle comprises a first transmitter for transmitting a first transmission signal from a transmitter at a vehicle toward one or more beacons associated with the work area. A time estimator determines a first aggregate elapsed time between the transmission of the first transmission signal to a first beacon and a return signal from the first beacon to the vehicle, a second aggregate elapsed time between the transmission of the first transmission signal to a second beacon and a return signal from the second beacon to the vehicle, and a third aggregate elapsed time between the transmission of the first transmission signal to a third beacon and a return signal from the third beacon to the vehicle. A bias compensator compensates for bias delay associated with at least one of the first transmitter, the first beacon, the second beacon and the third beacon. A converter converts the first aggregate elapsed time into a first position curve in at least two spatial dimensions for vehicle, the second aggregate elapsed time into a second position curve in at least two spatial dimensions for vehicle, and the third aggregate elapsed time into a third position curve in at least two spatial dimensions for vehicle. A data processor estimates a position of the vehicle at a confluence or intersection of the first position curve, the second position curve, and the third position curve.

BRIEF DESCRIPTION OF THE DRAWINGS

Throughout this document and the drawings, like reference numbers in different drawings indicate like elements.

DESCRIPTION OF THE PREFERRED EMBODIMENT

Figure 1:
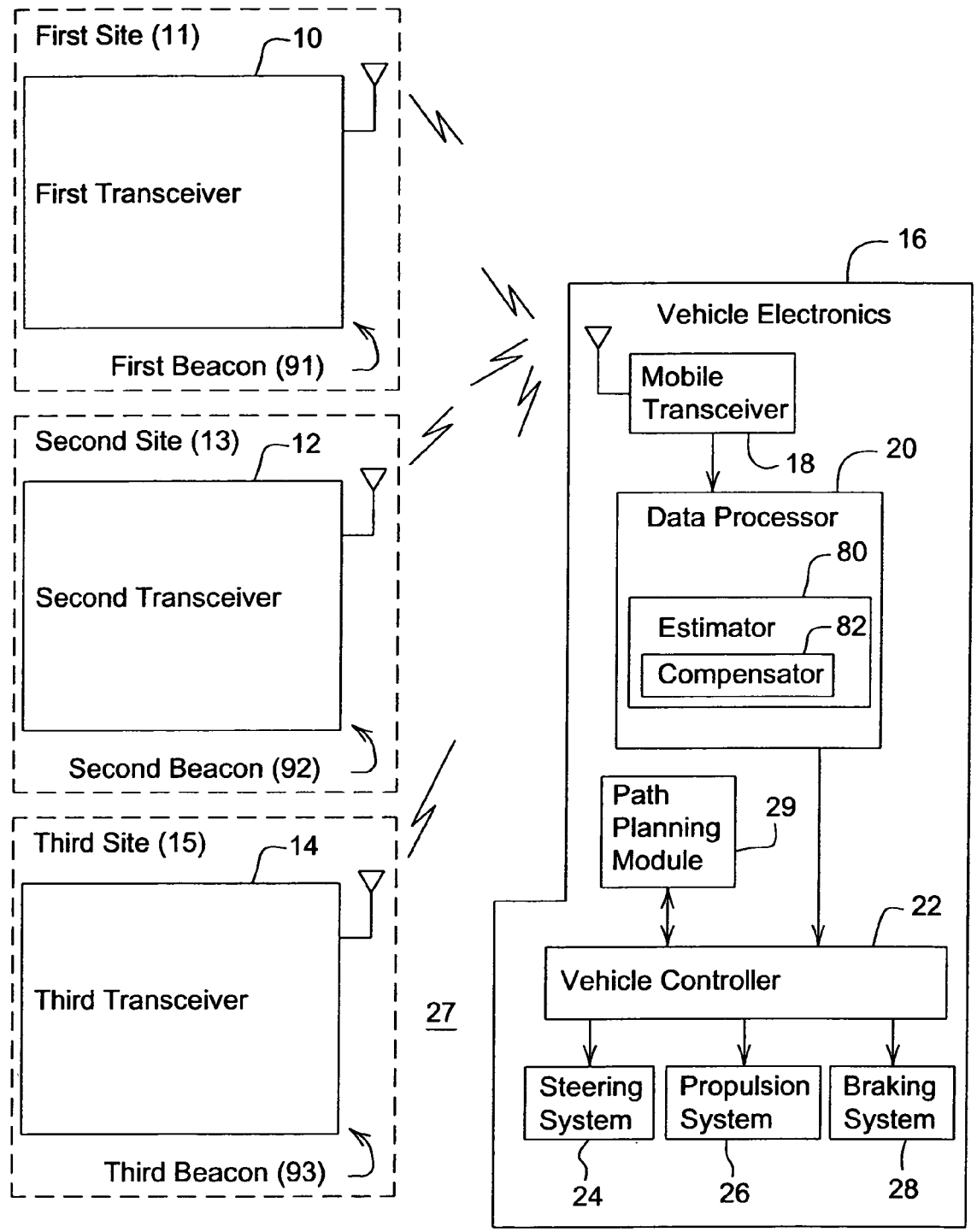
FIG. 1 is a block diagram of one embodiment of a system for determining a position of a vehicle with a compensator associated with the vehicle electronics.

FIG. 1 shows one embodiment of a system 27 for determining the location or position of a vehicle. The system 27 comprises vehicle electronics 16 associated with or mounted on a vehicle. The vehicle electronics 16 comprises a mobile transceiver 18 or transmitter that transmits a transmission signal to one or more beacons (91, 92, and 93). The beacons comprise a first beacon 91, a second beacon 92, and a third beacon 93 associated with the work area. For example, the beacons (91, 92, and 93) may be mounted near or around the perimeter of the work area.

In the embodiment of FIG. 1, the beacons (91, 92, 93) comprise transceivers (10, 12, 14). For example, the beacons comprise a first transceiver 10, a second transceiver 12, and a third transceiver 14. The first transceiver 10 is located at a first site 11; a second transceiver 12 is located at a second site 13; and a third transceiver 14 is located at a third site 15. The locations or coordinates of the first site 11, the second site 13, and the third site 15 may be determined during configuration or installation of the system, for example.

The vehicle electronics 16 comprises a mobile transceiver 18 coupled to a data processor 20. In turn, the data processor 20 is coupled to a vehicle controller 22. The vehicle controller 22 communicates with one or more of the following: a steering system 24, a propulsion system 26, braking system 28, and a path planning module 29.

The steering system 24 may comprise an electrically controlled hydraulic steering system, an electrically driven rack-and-pinion steering, an Ackerman steering system, or another steering system. The braking system 28 may comprise an electrically controlled hydraulic braking system, or another electrically controlled friction braking system. The propulsion system 26 may comprise an internal combustion engine, an internal combustion engine-electric hybrid system, an electric drive system, or the like.

The vehicle controller 22 may generate control signals for the steering system 24, the braking system 28 (if present), and a propulsion system 26 that are consistent with tracking a path plan, provided by the path planning module 29. For example, the control signals may comprise a steering control signal or data message that is time dependent and defines a steering angle of the steering shaft; a braking control signal or data message that defines the amount of deceleration, hydraulic pressure, or braking friction applied to brakes; a propulsion control signal or data message that controls a throttle setting, a fuel flow, a fuel injection system, vehicular speed or vehicular acceleration. If the vehicle is propelled by an electric drive or motor, the propulsion control signal or data message may control electrical energy, electrical current, or electrical voltage to the electric drive or motor.

In FIG. 1, the system 27 may provide turn-around ranging in which the vehicle electronics 16 or data processor 20 measures elapsed times of propagation for different direct paths between the vehicle electronics 16 and each beacon (91, 92 or 93). Here, for a given path each elapsed time of propagation represents a temporal difference between a transmission of a transmission signal from the mobile transceiver 18 and the reception time of a return signal at the mobile transceiver 18. Each return signal is generated at one of the beacons that receives the transmission signal from the mobile transceiver 18. The elapsed time comprises an outgoing path propagation time and an incoming path propagation time between the mobile transceiver 18 and each beacon, among the first beacon 91, the second beacon 92, and the third beacon 93.

In one embodiment, the compensator 82 may compensate for bias delay associated with each beacon. For example, the first transceiver 10 may be associated with a first bias delay; the second transceiver 12 may be associated with a second bias delay; the third transceiver 14 may be associated with a third bias delay. The bias delay results from any signal processing that takes place at the beacon. For example, demodulation of the transmission signal received from the mobile transceiver 18, modulation of the return signal, amplification, coding, or decoding are subject to bias delay. If the return transmission associated with each different propagation path is identifiable by its frequency, amplitude, phase, modulation, time slot (e.g., for time division multiplex), code (e.g., for code division multiplex), or otherwise, the compensator 82 may assign a corresponding bias delay for transmission over a corresponding return signal. Accordingly, the compensator 82 supports distinct bias delays (e.g., first bias delay, second bias delay, and third bias delay) for each beacon to account for differences in the equipment that may occur from variation in components, manufacturing or their environment (e.g., semiconductor fabrication, manufacturing, thermal stress, temperature differences at the site of installation, or otherwise.)

In another embodiment, the compensator 82 may further comprise a bias compensation device for reducing delay bias, a filter for filtering out phase noise, or both. For example, a filter may comprise a phased locked loop circuit for reducing phase noise in a pulse train at baseband or an intermediate frequency associated with a beacon and corresponding propagation path. The filter may comprise a low-pass filter prior to a discriminator for identifying a leading edge of the pulses of a pulse train, or another suitable configuration.

Figure 2:
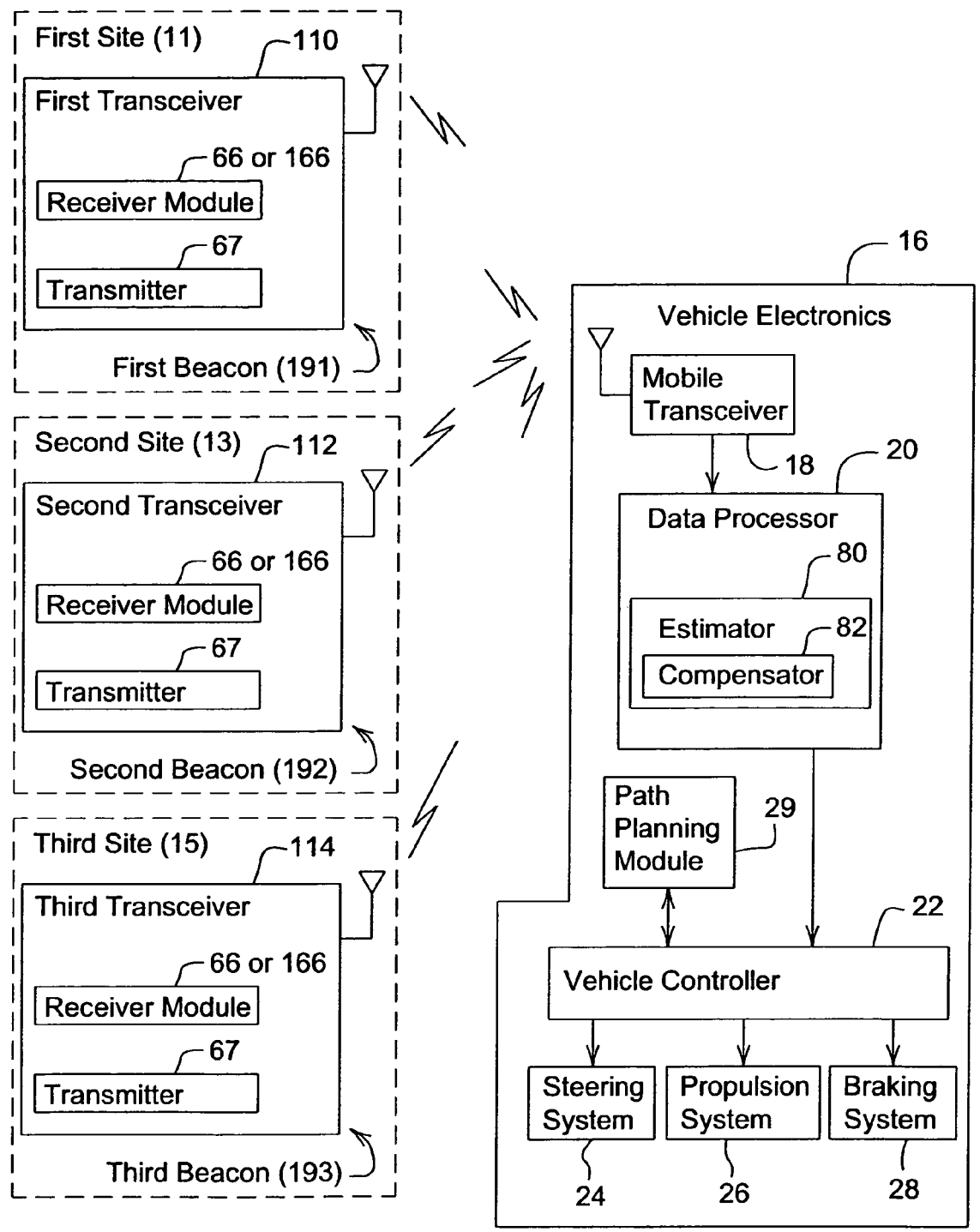
FIG. 2 is a block diagram of another embodiment of a system for determining a position of a vehicle with a compensator associated with the beacons and the vehicle electronics.

The system 127 of FIG. 2 is similar to the system 27 of FIG. 1, except the transceivers (110, 112, and 114) of FIG. 2 replace the transceivers (10, 12, and 14) of FIG. 1. The first beacon 191 is associated with the first transceiver 110; the second beacon 192 is associated with the second transceiver 112; the third beacon 193 is associated with the third transceiver 114. The first transceiver 110, the second transceiver 112 and the third transceiver 114 each comprise a receiver module (66 or 166 of FIG. 6 of FIG. 7) and a transmitter 67. The receiver module (66 or 166) comprises an estimator 80 and a compensator 82 as shown later in greater detail.

The system 127 of FIG. 2 may employ a two-way ranging scheme. In a two-way ranging scheme, the mobile transceiver 18 and the other transceiver (110, 112 and/or 114) transmit transmission signals (e.g. identifiable pulses) and receive the transmission signals. The transmission signals from the beacon and each site may be transmitted in a simplex manner (e.g., serially) or in a duplex manner (e.g., generally simultaneously) depending upon the modulation scheme or frequency of transmission. The transceiver (110, 112 or 114) or vehicle electronics 16 on each side of the communications path between the vehicle and the beacon estimates a time of arrival of the transmission signal. By measuring the time of arrival in each direction along a communications path, errors may be reduced, such as bias delay or transceiver clock errors. For example, an errant bias delay for one direction may be reduced in significance by unweighted or weighted averaging with an accurate bias delay in another direction or by applying more sophisticated error detection or correction algorithms. The compensator 82 may be located at the vehicle electronics 16 and at each beacon to provide compensation for bias delay, noise measurement error, or both.

Figure 3:
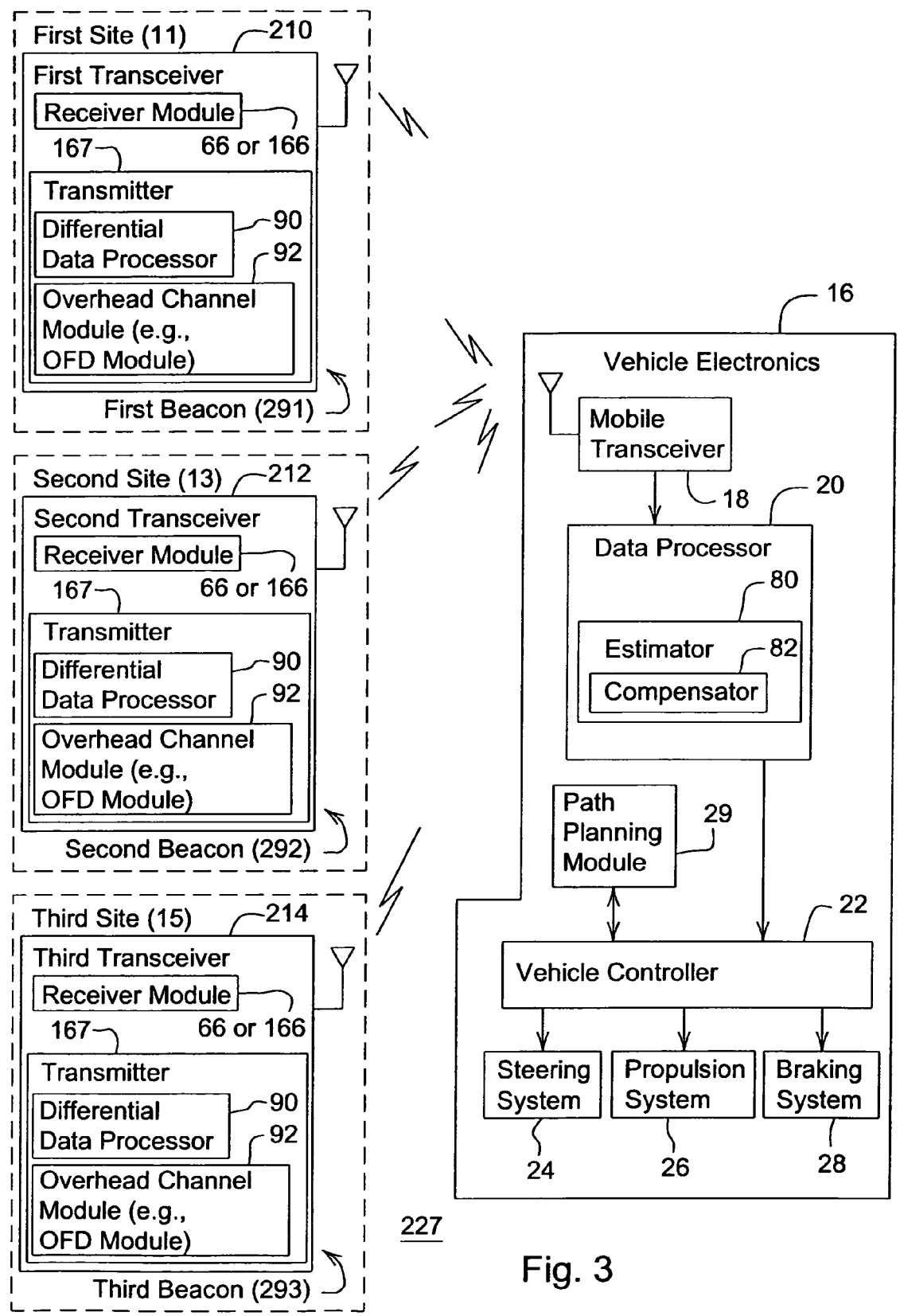
FIG. 3 is a block diagram of yet another embodiment of a system for determining the position of a vehicle where an overhead data channel is used to transmit position, temporal or differential data.

The system 227 of FIG. 3 is similar to the system 127 of FIG. 2, except the transmitter 167 of FIG. 3 replaces the transmitter 67 of FIG. 2. The first beacon 291 is associated with the first transceiver 210; the second beacon 292 is associated with the second transceiver 212; the third beacon 293 is associated with the third transceiver 214.

In one embodiment, each transmitter 167 comprises a differential data processor 90 and an overhead channel module 92. The differential data processor 90 may accept an input of one or more of the following input data: time of arrival data for a transmission signal (e.g., an identifiable pulse), propagation delay data between the vehicle electronics 16 and the beacons (291, 292 and 293), position data, temporal data, or other data indicative of the vehicle location, or precursor thereto. The differential data processor 90 outputs differential data based on the input data. In one embodiment, the differential data represents a change in the input data. For example, if the vehicle is stationary, there may be no differential data or only limited data (e.g., pilot code or tone) to broadcast, because there is no change in position data to convey. The differential data processor 90 serves as a data compressor to minimize the bandwidth or transmission capacity among the beacons (291, 292, 293) and the vehicle electronics 16 to facilitate determination of the position (e.g., coordinates) of the vehicle. The differential data processor 90 may be well-suited to use in conjunction with an overhead transmission module 92, where bandwidth or the maximum bit rate may be limited.

The overhead channel module 92 may support transmission of the differential data (or even input data) on a subcarrier or overhead channel (e.g., orthogonal frequency division multiplex (OFDM)). In the overhead channel module 92, one example of subcarrier channel is OFDM, which uses overlapping orthogonal signals to divide a frequency selective broadband channel into a group of narrowband channels. A block of symbols may be encoded using a Fourier Transform (e.g., Fast Fourier Transform), or another data processing technique and transmitted simultaneously over a number of subchannels using multiple carriers. To conserve bandwidth or communications resources, the mobile transceiver 18 and other transceivers (210, 212 and 214) may transmit differential data to one another over a subcarrier channel (e.g., OFDM channel).

In any of the configurations disclosed herein, the mobile transceiver 18 may transmit an identifiable pulse (e.g., a pseudo-random noise code, a phase shifting keying modulation, pulse width modulation, pulse amplitude modulation, or another suitable modulation or code) may be transmitted on a carrier (e.g., radio frequency or microwave carrier) or suppressed carrier, whereas a subcarrier channel may be modulated with position data, temporal data, expressed as differential data or otherwise. The data processor 20 ultimately uses position data or temporal data, or corresponding differential data, for three paths to delay a position solution (e.g., coordinates) for the vehicle: a first propagation path between the vehicle electronics 16 and the first beacon 291, a second propagation path between the vehicle electronics 16 and the second beacon 292, and a third propagation path between the vehicle electronics 16 and the third beacon 293.

Figure 4:
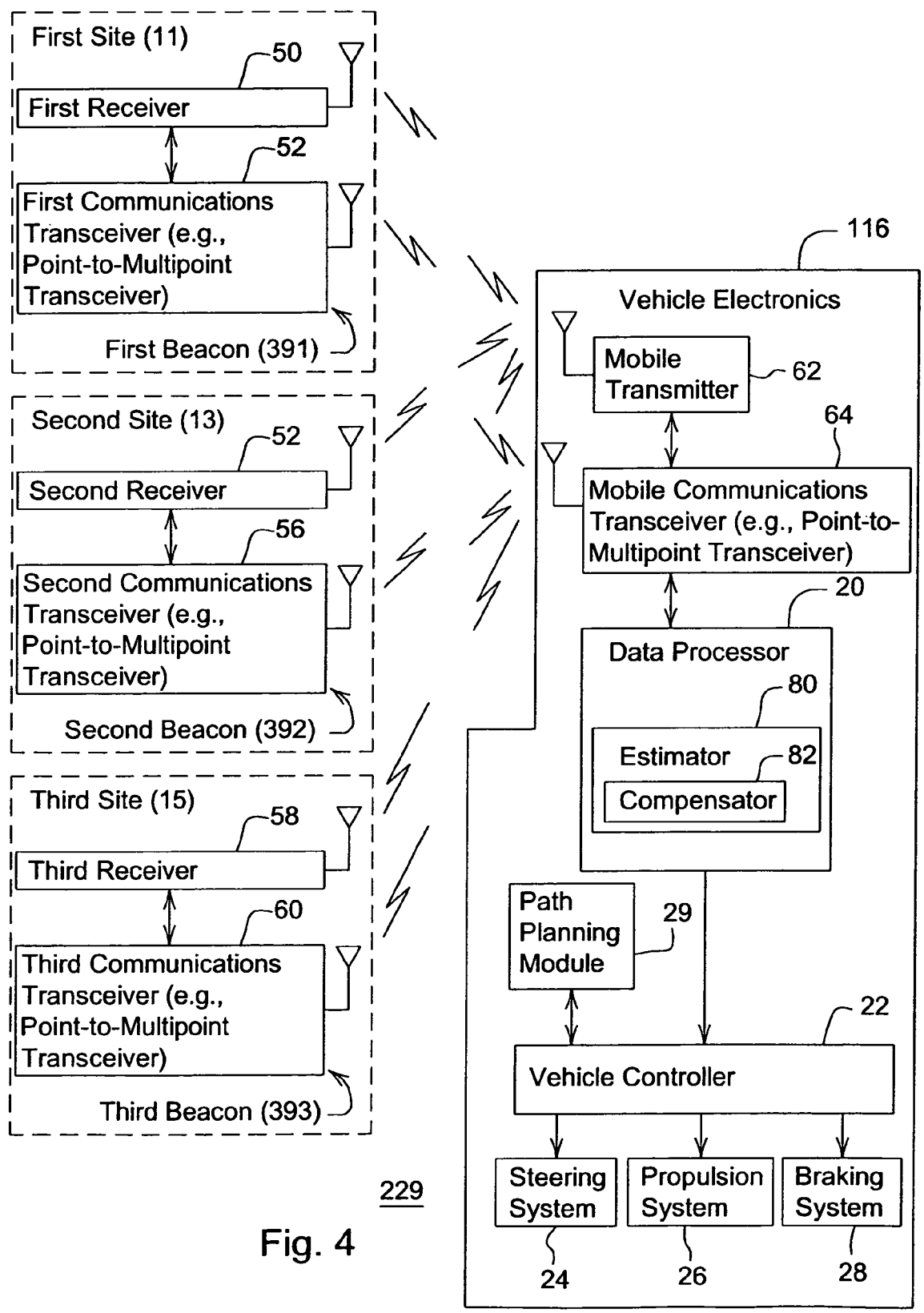
FIG. 4 is a block diagram of one embodiment of a system for determining a position of a vehicle with a compensator associated with the vehicle electronics.

The system 229 of FIG. 4 is similar to the system 27 of FIG. 1, except each beacon (391, 392, and 393) of FIG. 4 comprises the combination of a receiver (50, 52 and 58) and a communications transceiver (52, 56 and 60), among other things. Further, the vehicle electronics 116 of FIG. 4 replaces the mobile transceiver 18 of FIG. 1 with the combination of a mobile transmitter 62 and mobile communications transceiver 64. Like reference numbers in FIG. 1 and FIG. 4 indicate like elements.

In FIG. 4, the vehicle electronics 116 comprises a mobile transmitter 62 coupled to a mobile communications transceiver 64. In turn, the mobile communications transceiver 64 communicates with the data processor 20.

At the first site 11, the first beacon 391 comprises a first receiver 50 associated with a first communications transceiver 52. For example, the first communications transceiver 52 may comprise a point-to-multipoint transceiver. At the second site 13, the second beacon 392 comprises the combination of a second receiver 52 and a second communications receiver 56. At the third site 15, the third beacon 393 comprises a third receiver 58 associated with a third communications receiver 60.

In FIG. 4, the system 229 may provide turn-around ranging in which the vehicle electronics 116 or data processor 20 measures elapsed times of propagation for different direct paths between the vehicle electronics 116 and the beacons (391, 392, 393). Here, for a given path each elapsed time of propagation represents a temporal difference between a transmission of a transmission signal from the mobile transmitter 62 and the reception time of a return signal at the mobile communications transceiver 64. Each return signal is generated at one of the beacons (391, 392 or 393) that receives the transmission signal from the vehicle electronics 116. The elapsed time comprises an outgoing path propagation time and an incoming path propagation time between the mobile transmitter 62 and each beacon, among the first beacon 391, the second beacon 392, and the third beacon 393.

In one embodiment, the compensator 82 may compensate for bias delay associated with each beacon, phase noise, or other noise, or any combination of bias delay compensation and noise compensation as previously discussed in conjunction with FIG. 1.

Figure 5:
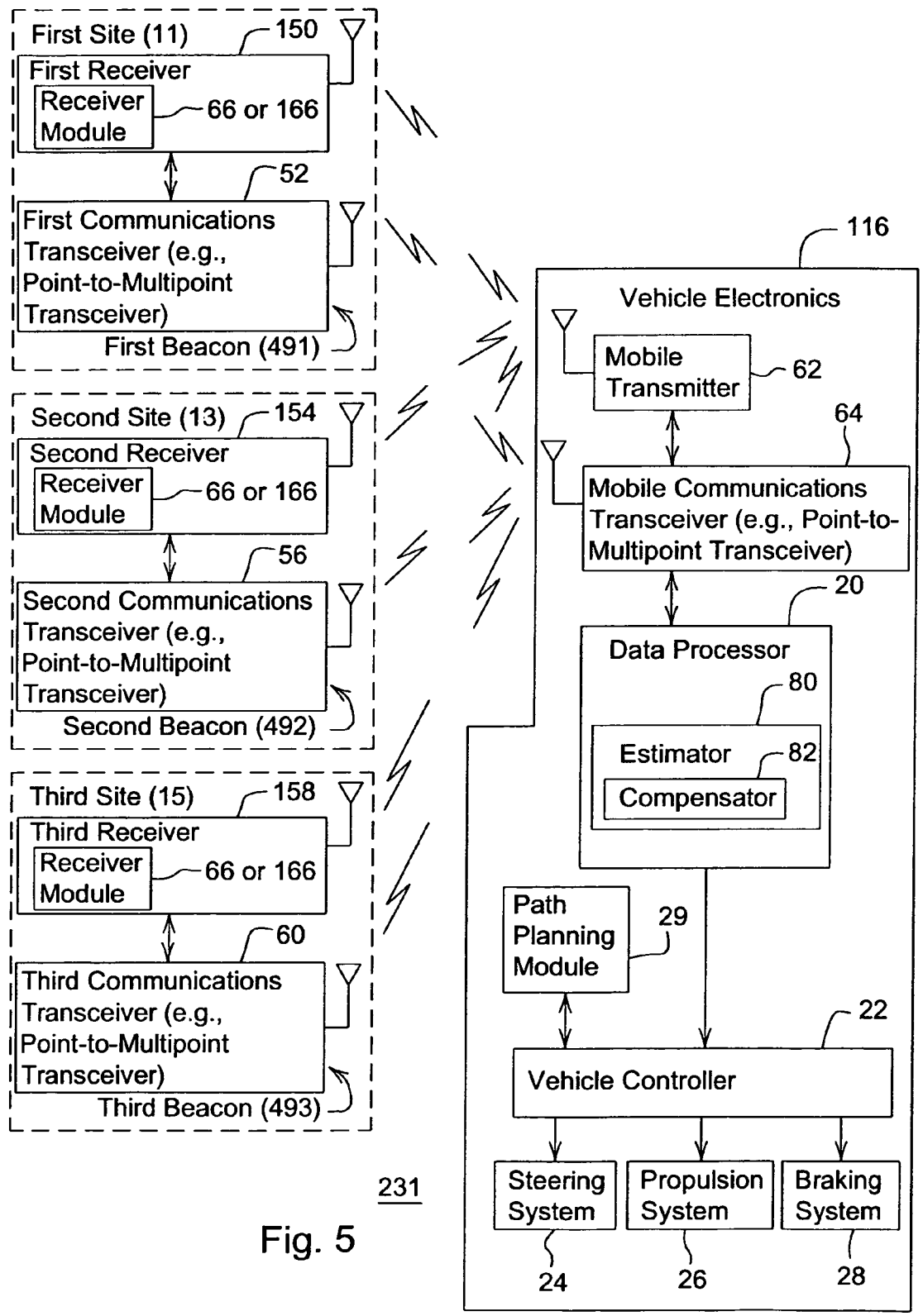
FIG. 5 is a block diagram of another embodiment of a system for determining a position of a vehicle with a compensator associated with the beacons and the vehicle electronics.

The system 231 of FIG. 5 is similar to the system 229 of FIG. 4, except the receivers (150, 154, and 158) of FIG. 5 replace the receivers (50, 52, and 58) of FIG. 4. The receiver module (66 or 166) comprises an estimator 80 and a compensator 82 as shown later in greater detail.

The system 231 of FIG. 5 may employ a two-way ranging scheme. In a two-way ranging scheme, the mobile transmitter 62 and the other communications transceiver(s) (52, 56 and/or 60) transmit transmission signals (e.g. identifiable pulses). The receivers (150, 154 and 158) and the mobile communications transceiver 64 receive the transmission signals. The first receiver 150, the second receiver 154, and the third receiver 158 at the beacons estimate a time of arrival of the transmission signal. The mobile communications transceiver 64 estimates a time of arrival of the return signals transmitted from the first communications transceiver 52, the second communications transceiver 56, and the third communications transceiver 60. By measuring the time of arrival in each direction along a communications path, errors may be reduced, such as bias delay or transceiver clock errors. For example, an errant bias delay for one direction (of a propagation path) may be reduced by averaging, weighted averaging, unweighted averaging with a reliable bias delay for an opposite direction (of the propagation path). The compensator 82 may be located at the vehicle electronics 116 and at each beacon (491, 492, 493). In one embodiment, the compensator 82 may compensate for bias delay associated with each beacon, phase noise, or any combination of bias delay compensation and noise compensation, as previously discussed in conjunction with FIG. 4.

Figure 6:
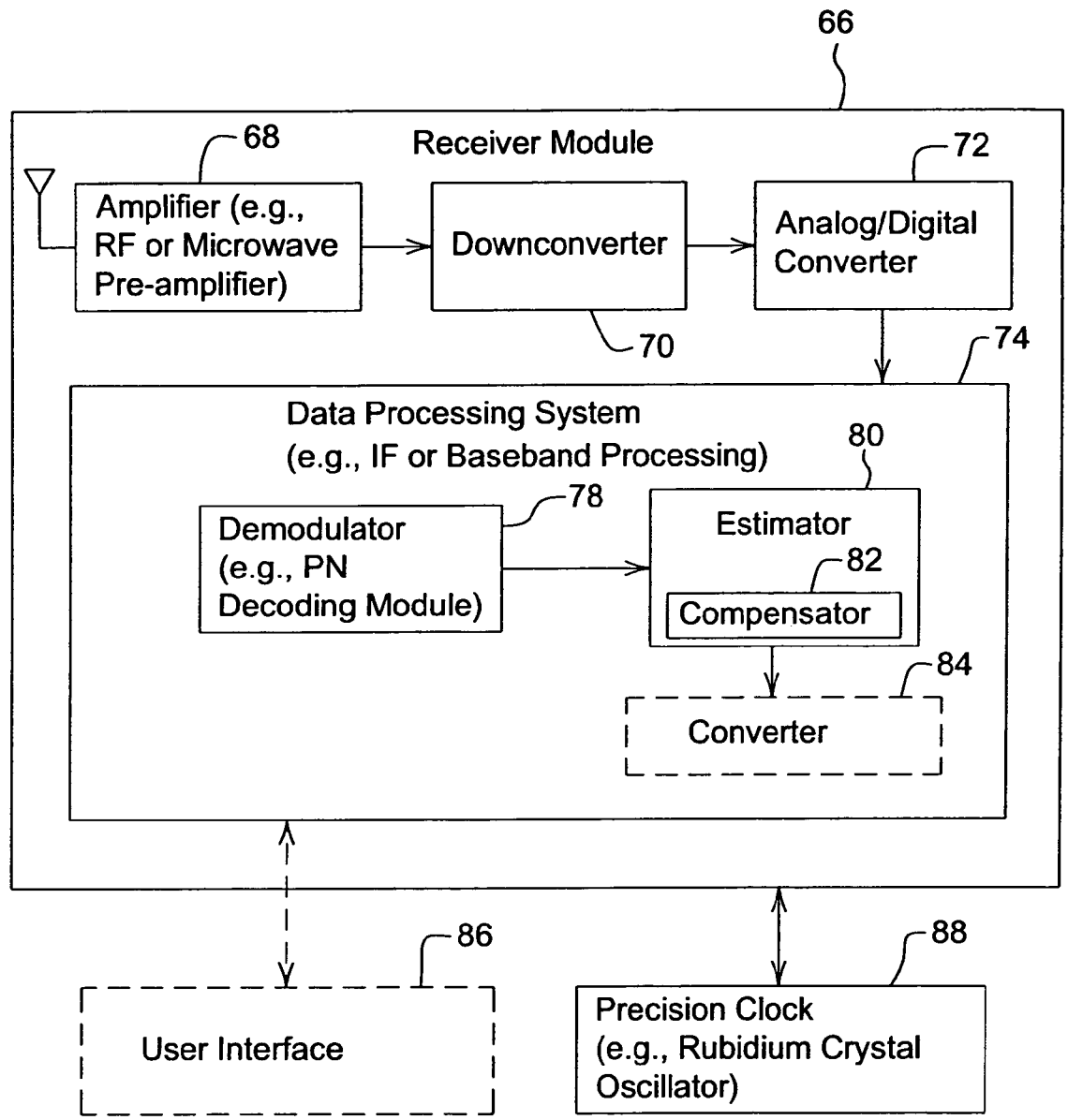
FIG. 6 is a block diagram of one embodiment of a receiver module.

FIG. 6 provides one possible embodiment for a receiver module 66 consistent with the transceivers of FIG. 2, FIG. 3, or FIG. 5, for example.

The receiver module 66 comprises an amplifier 68 coupled to a downconverter 70. The downconverter 70 is coupled to an analog-to-digital converter 72. In turn, the analog-to-digital converter 72 is coupled to a data processing system 74.

The amplifier 68 may comprise a radio-frequency (RF) or microwave pre-amplifier (e.g., a low noise Gallium Arsenide pre-amplifier or receiver front-end). The downconverter 70 may comprise a mixer (e.g., a high stability voltage controlled oscillator).

In one embodiment, the data processing system 74 includes a demodulator 78 coupled to an estimator 80. The demodulator 78 or estimator 80 may comprise a discriminator for identifying a leading edge of an identifiable pulse of a signal (e.g., a transmission signal or return signal), a discriminator for identifying a trailing edge of a pulse of a signal, or another discriminator for identifying the timing of a pulse. The pulse may modulate a carrier signal or a suppressed carrier signal, for example. The pulse may be coded in accordance with a pseudo-random noise code (e.g. a PN code) or another modulation or encoding scheme. A pseudo-random noise code is typically used with code-division multiple access or spread spectrum systems.

The estimator 80 is associated with a compensator 82. The estimator 80 may provide an input to the converter 84, which is shown in dashed lines to indicate that the converter 84 is optional. The estimator 80 estimates the temporal curves representative of propagation delays associated with different propagation paths between the vehicle electronics (16 or 116) and the beacons. The description of the compensator 82 previously set forth in the description of FIG. 1 applies equally to FIG. 6.

The converter 84 may convert the temporal curves produced by the estimator 80 into distance curves. That is, the converter 84 converts the temporal solution of the estimator 80 into a position solution for the vehicle location (e.g., two or three dimensional coordinates).

The receiver module 66 may receive a clock signal from a precision clock 88 to assist in synchronization with the transmitter 62 or transceiver 18 that transmits a transmission signal.

In one embodiment, an optional user interface 86 may be coupled to the receiver module 66 to program it. For example, the optional user interface 86 may be used to set parameters of the compensator 82, compensator settings, or other data processing settings of the data processing system 74. The user interface 86 and the converter 84 is shown in dashed lines to indicate that the user interface 86 and the distance converter are optional elements, and need not be present.

Figure 7:
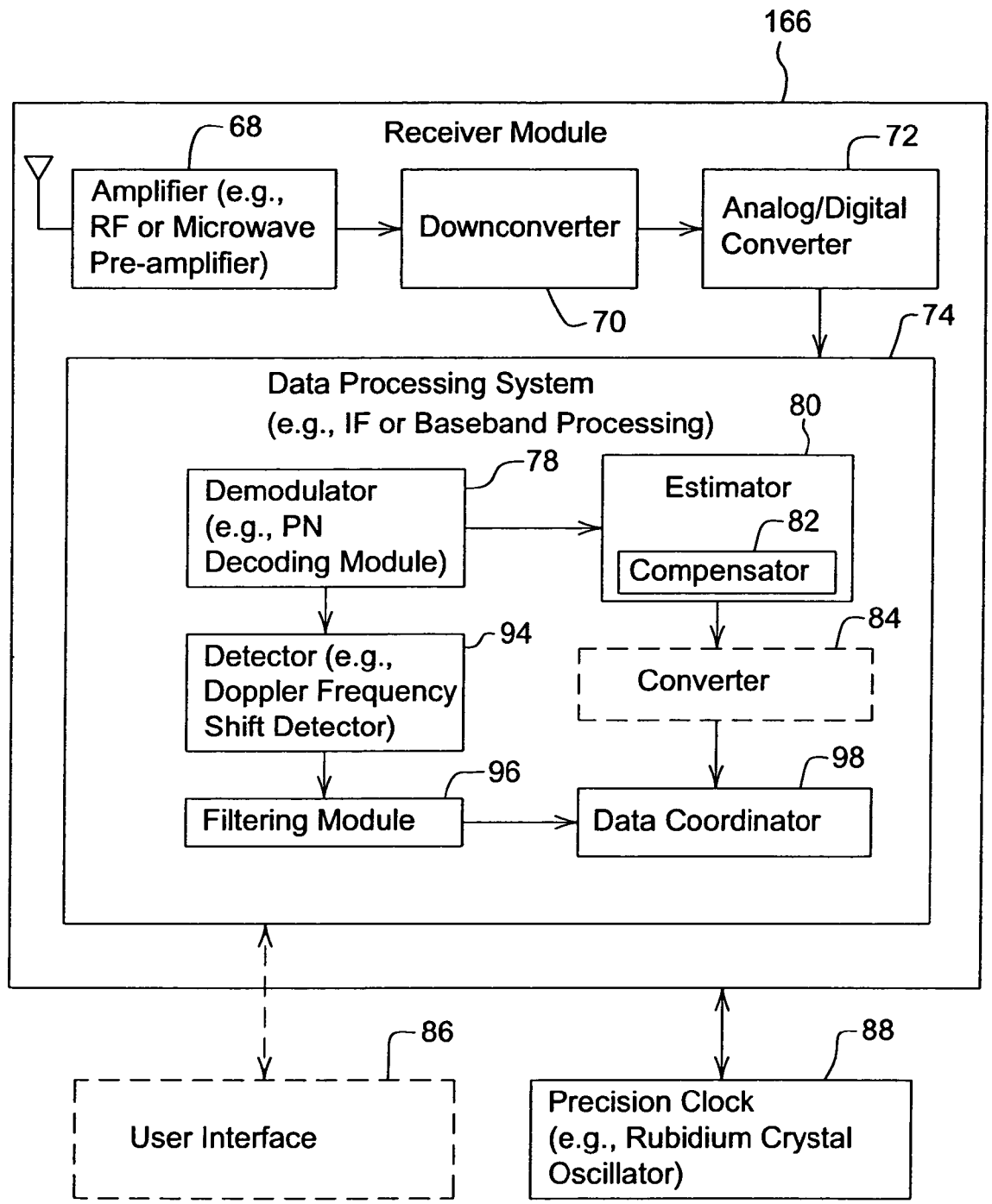
FIG. 7 is a block diagram of another embodiment of a receiver module.

FIG. 7 shows another embodiment of a receiver module 166. The receiver module 166 of FIG. 7 differs from the receiver module 66 of FIG. 6 in that the receiver module 166 of FIG. 7 further includes a detector 94 coupled to a filtering module 96. In turn, the filtering module 96 and the converter 84 provide input data to a data coordinator 98.

In one embodiment, the detector 94 comprises a Doppler frequency shift detector for detecting a change in frequency of transmission from the vehicle based on the movement, direction or movement, velocity or speed of the vehicle, which may collectively be referred to as velocity data. The data coordinator 98 associates, registers, or superimposes the velocity data with the position data output of the converter 84. For example, the data coordinator 98 may associate position data (e.g., two or three dimensional coordinates) of the vehicle with corresponding vehicular speed and direction, where available from the detector 94 or the filtering module 96. The filtering module 96 discards measured frequency shifts of the detector 94 that exceed a maximum vehicular velocity of the vehicle to reduce data processing requirements (e.g., of the data processor 20 for determination of vehicle position or velocity data). The user interface 86 may be used to enter the maximum vehicular velocity data into the filtering module 96.

Figure 8:
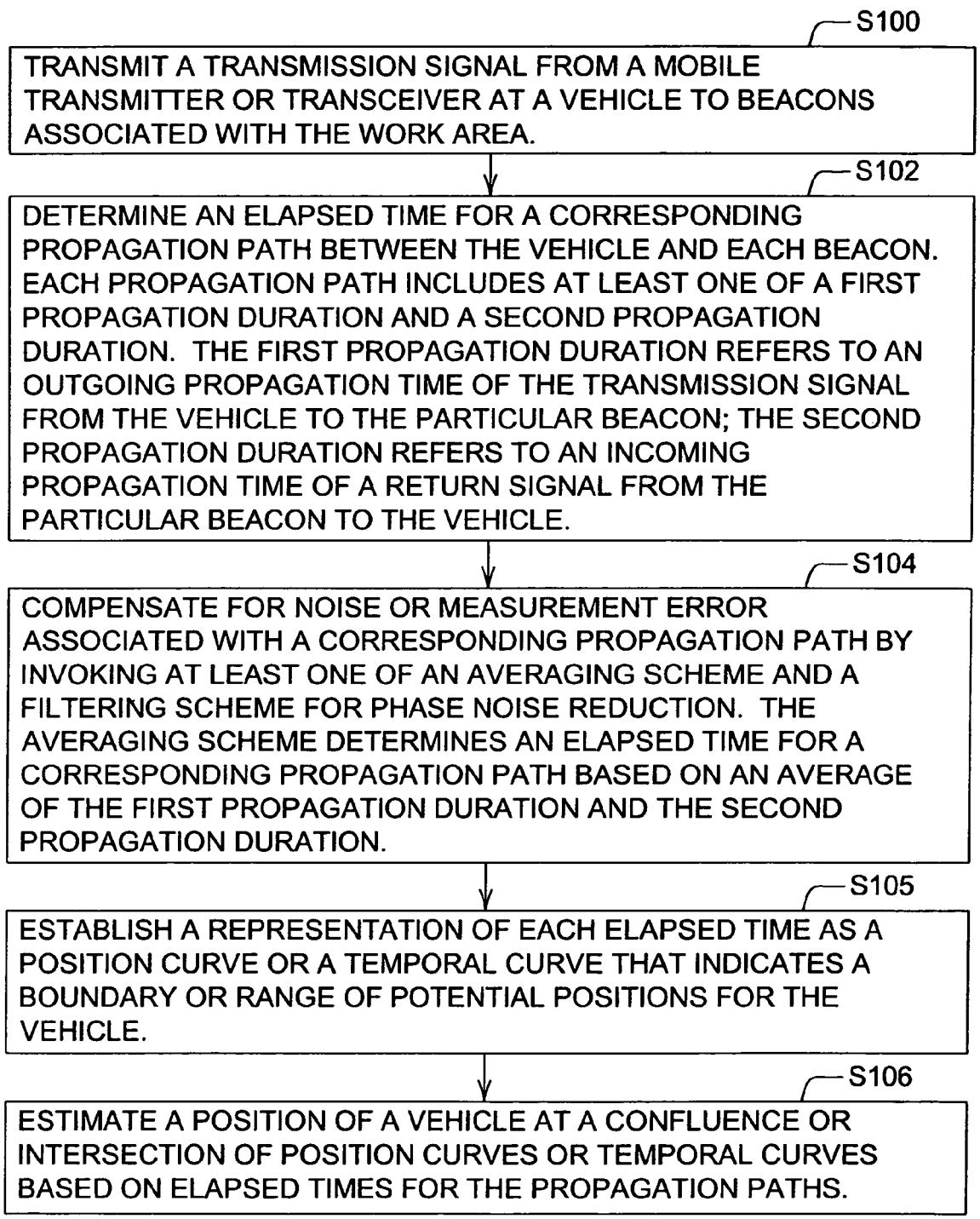
FIG. 8 is a flow chart of a method for determining a position of a vehicle with compensation to compensate for noise or measurement error.

FIG. 8 shows a method for determining the location or position of a vehicle in a work area. The method of FIG. 8 begins in step S100.

In step S100, a mobile transmitter 62 or mobile transceiver 18 at a vehicle transmits a transmission signal to one or more beacons (e.g., 91, 92, 93) associated with the work area. Each beacon is associated with a corresponding transceiver (e.g., 10, 12 14) or receiver for receiving the transmission signal.

In step S102, a data processor 20 or data processing system 74 determines an elapsed time for a propagation path between the vehicle and each beacon. The elapsed time includes at least one of a first propagation duration and a second propagation duration. The first propagation duration refers to an outgoing propagation time of the transmission signal from the vehicle to the particular beacon; the second propagation duration refers to an incoming propagation time of a return signal from the particular beacon to the vehicle. For a turn-around ranging procedure, the elapsed time may represent a round-trip propagation path that is the sum of the first propagation time and the second propagation time. For a two-way ranging procedure, the elapsed time may represent one-way propagation path or the average of the first propagation duration and the second propagation duration.

In step S104, a compensator 82 compensates for noise or measurement error associated with a corresponding propagation path by invoking at least one of an averaging scheme and a filtering scheme for phase noise reduction. The averaging scheme determines the elapsed time for a corresponding propagation duration and second propagation duration based on an average (e.g., mathematical mean) of the first propagation duration and the second propagation duration.

In accordance with a first filtering scheme for phase noise reduction, a compensator 82 or estimator 80 uses a phase locked loop circuit as a filter to filter a pulse or pulse train associated with the receiver module (66 or 166) or decoder to reduce an input noise phase component of the input phase. The phase locked loop may comprise a low pass filter to reduce input phase noise at the phase locked loop output relative to the phase locked loop input. The phase noise at the output depends upon the loop parameters, such as bandwidth and damping factor. Further, the phase locked loop may form a running average over a time duration for the output phase based on its loop bandwidth and a group of pulses.

In accordance with a second filtering scheme for phase noise reduction, the compensator 82 or estimator 80 comprises may comprise a leading edge discriminator. The leading edge discriminator detects the arrival time of a pulse to determine the time of receipt of the return signal, for example. In one arrangement, the leading edge discriminator comprises a phase-locked loop or other precision oscillator for generating a reference signal. Further, the reference signal along with a received signal (e.g., associated with an identifiable pulse) is fed to a comparator. The noise at the output of the phased lock loop may depend upon loop parameters such as bandwidth and damping factor, which tends to reduce the noise at the output of the comparator.

In step S105, a data processor 20 establishes a representation of each elapsed time as a position curve or a temporal curve that indicates a boundary or range of potential positions for the vehicle. Each of the elapsed times may be modeled as a temporal curve or a position curve that indicates an estimated position of the vehicle or that indicates boundary within which a vehicle position lies. The temporal curves or position curves need not be any particular format, and may be expressed as curve equations, mathematical equations, polynomial expressions, linear equations, vectors, matrices, graphically, or as a series of point coordinates, for example. The data processor 20 or converter 84 may derive the position curve from the elapsed times or temporal curves by applying a proportional mathematical relationship between the respective temporal curve and the corresponding position curve for a given propagational path between the vehicle and the beacon.

If the converter 84 is used, the converter 84 may convert the elapsed propagation time into a radius or distance based on the following equation: distance $= c*t$, where $c = 3 \times 10^8$ meters/seconds (speed of light), $t =$ elapsed time or propagation time, and distance is distance in meters. If the round trip propagation time is used as the elapsed time (e.g., in the turn-around ranging procedure), the distance (d) is divided by two to obtain the distance or radius between the antenna of the vehicle electronics and the beacon antenna associated with the beacons.

In step S106, a data processor 20 or estimator 80 estimates a position of the vehicle at or near a confluence or intersection of position curves or temporal curves. The estimating may be carried out in accordance with various techniques that may be applied alternately or cumulatively.

In accordance with a first technique, the estimator 80 assigns an approximately equal weight to the first position curve, the second position curve, and the third position curve to estimate the position of the vehicle.

In accordance with a second technique, the estimator 80 assigns differential weights to the first position curve, the second position curve, and the third position curve based on at least one probability density function for the first position curve, the second position curve and the third position curve to estimate the position of the vehicle.

In accordance with a third technique, the estimator 80 collects a series of first position curves and averages the series of first position curves over time; the estimator 80 collects a series of second position curves and averaging the series of first position curves over time; and the estimator 80 collects a series of third position curves and averaging the series of position curves over time to estimate the position of the vehicle.

In accordance with a fourth technique, the estimator 80 collects a series of first position curves and fits the first position curves to a generally linear progression over time, the estimator 88 collects a series of second position curves and fits the second position curves to a generally linear progression over time, the estimator 80 collects a series of third position curves and fits the third position curves to a generally linear progression over time in accordance with at least one a least squares approach and a weighted least squares approach.

Under a fifth technique, the estimator 80 or filter filters by applying differential weights to different position curves to compensate for the influence of noise on the estimated vehicle position.

In accordance with a sixth technique, the estimator 80 assigns an approximately equal weight to the first temporal curve, the second temporal curve, and the third temporal curve to estimate the position of the vehicle.

In accordance with a seventh technique, the estimator 80 assigns differential weights to the first temporal curve, the second temporal curve, and the third temporal curve based on at least one probability density function for the first temporal curve, the second temporal curve and the third temporal curve to estimate the position of the vehicle.

In accordance with an eighth technique, the estimator 80 collects a series of first temporal curves and averages the series of first temporal curves over time; the estimator 80 collects a series of second temporal curves and averaging the series of first temporal curves over time; and the estimator 80 collects a series of third temporal curves and averaging the series of temporal curves over time to estimate the position of the vehicle.

In accordance with a ninth technique, the estimator 80 collects a series of first temporal curves and fits the first temporal curves to a generally linear progression over time, the estimator 88 collects a series of second temporal curves and fits the second temporal curves to a generally linear progression over time, the estimator 80 collects a series of third temporal curves and fits the third temporal curves to a generally linear progression over time in accordance with at least one of a least squares approach and a weighted least squares approach.

Under a tenth technique, the estimator 80 or filter filters by applying differential weights to different temporal curves to compensate for the influence of noise on the estimated vehicle position.

Figure 9:
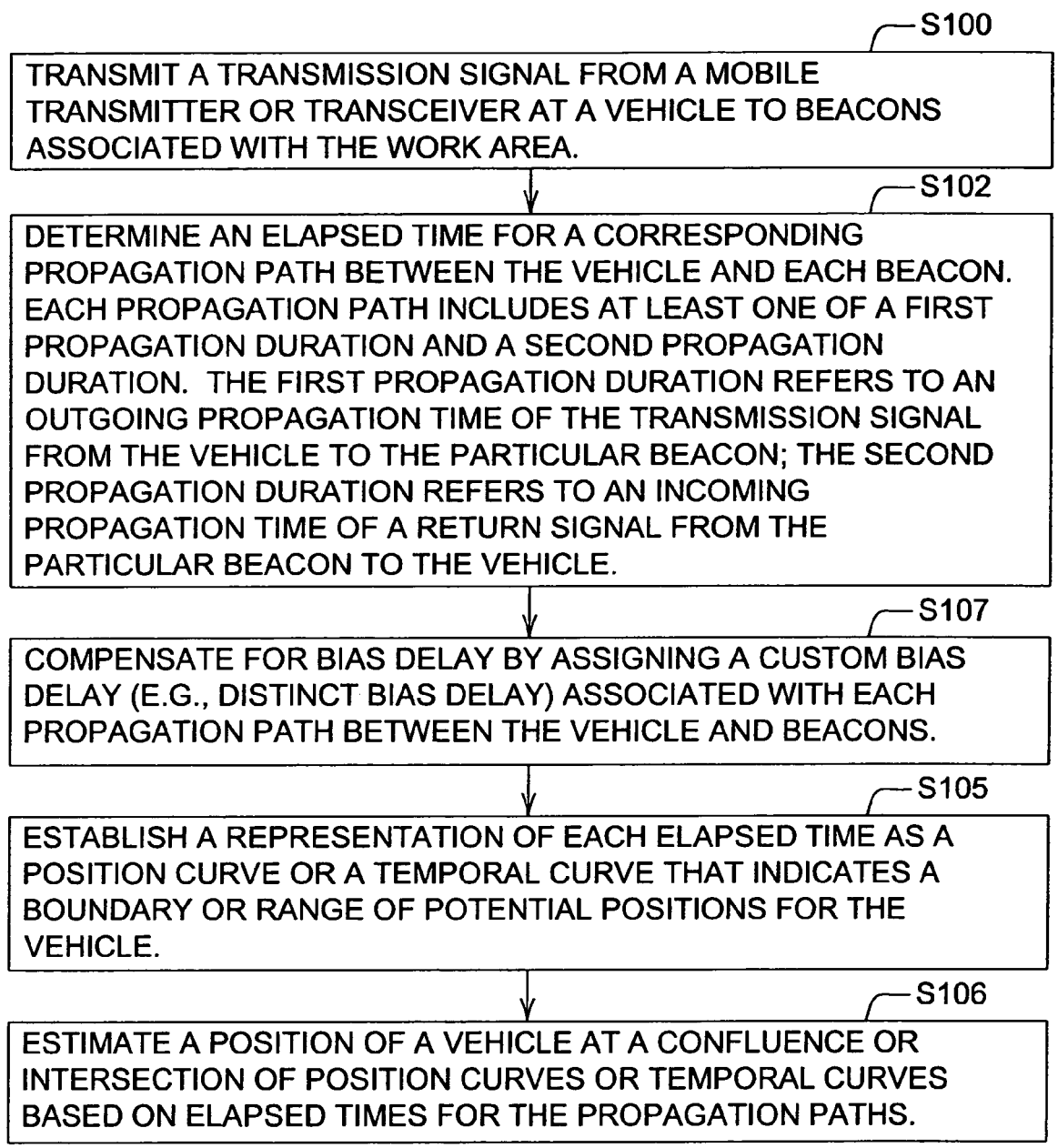
FIG. 9 is a flow chart of a method for determining a position of a vehicle with compensation for bias delay.

The method of FIG. 9 is similar to the method of FIG. 8, except step S104 of FIG. 8 is replaced by step S107 of FIG. 9. Like reference numbers in FIG. 8 and FIG. 9 indicate like steps or procedures.

In step S107, the estimator 80 or compensator 82 may compensate for bias delay by assigning a custom bias delay (e.g., generally independent or distinct bias delay) associated with each propagation path between the vehicles and beacons. A first propagation path may comprise the propagation path between the vehicle and a first beacon; the second propagation path may comprise the propagation path between the vehicle and a second beacon; the third propagation path comprises the propagation path between the vehicle and the third beacon. Accordingly, the compensator may assign a first bias delay to the first propagation path, a second bias delay to the second propagation path, and a third bias delay to a third propagation path, where the first bias delay, the second bias delay and the third bias delay may differ independently from one another based on differences in the manufacturing, components, or environment that is associated with each beacon.

In one example of carrying out step S107, a compensator 82 or estimator 80 applies bias compensation to a turn-around ranging scenario in which a transmission is transmitted from a vehicle to a beacon, and then a return transmission is transmitted from the beacon back to the vehicle. For turn-around ranging, the compensator 82 may make a time or distance deduction for bias or processing lag within each beacon. The bias compensation deducts a bias delay for one or more of the following: (1) processing of the transmission and generation of the return signal at the beacon, (2) receiving the return signal at the vehicle electronics, and (3) processing of the return signal at the vehicle electronics. The bias compensation may depend upon the type of modulation of the transmission, the transmission signal, the return signal, the transmitter hardware, the receiver hardware, and the computational resources of the data processor 20, or data processing system of the receiver module 66 or 166. For example, a typical delay factor or a measured (e.g., factory tested) delay factor may be entered into or programmed into data storage, registers, or memory of the compensator 82 or associated devices such that the delay factor may be subtracted from the difference between the transmission time from the vehicle electronics (16 or 116) and the reception time at the vehicle electronics (16 or 116). Although the method of FIG. 9 references a turn-around ranging scenario, the method of FIG. 9 may also be applied generally to two-way ranging or one-way ranging scenarios.

Figure 10:
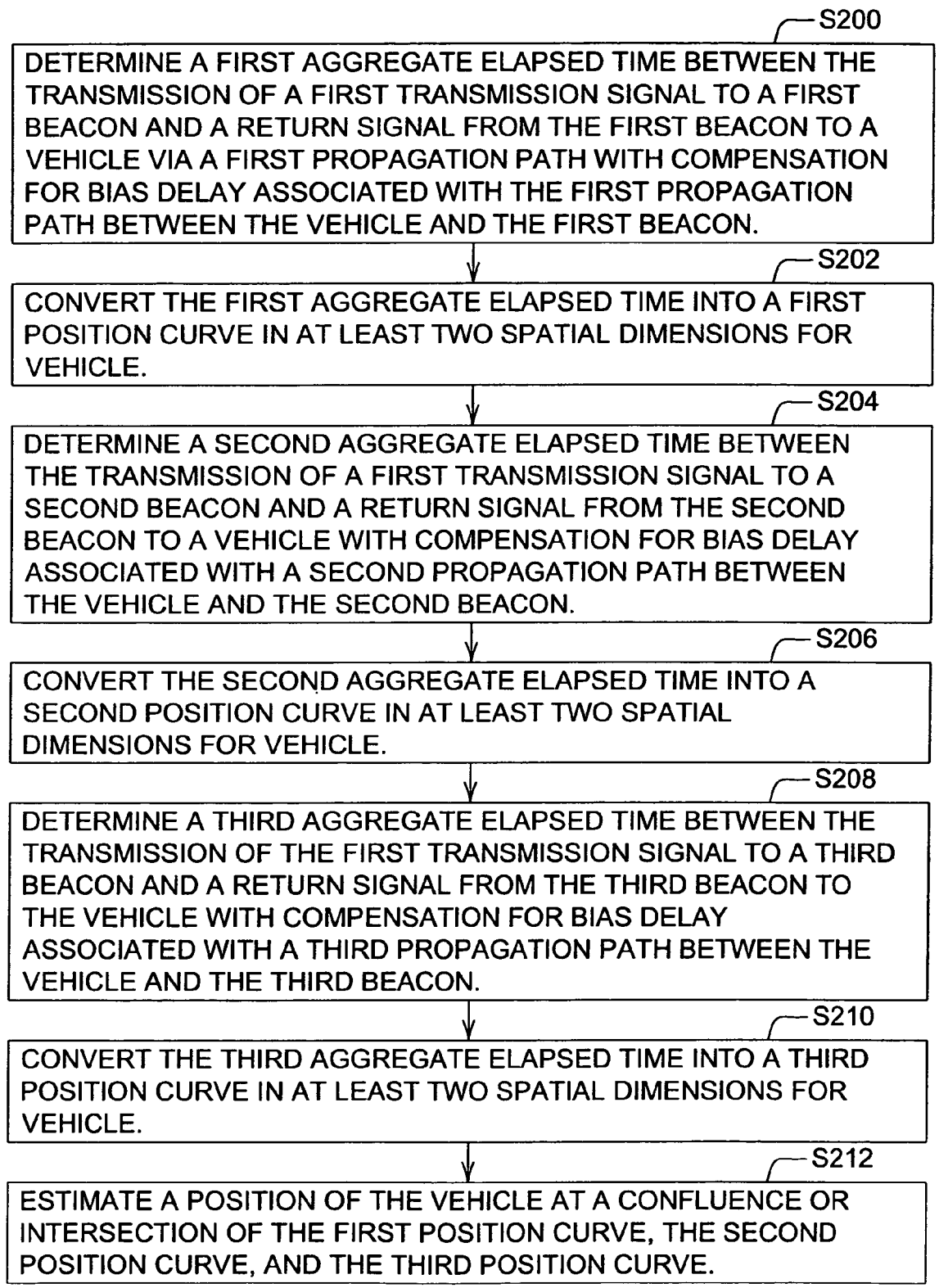
FIG. 10 is a flow chart of another method for determining a position of a vehicle with compensation for bias delay.

FIG. 10 shows a method for determining the location or position of a vehicle in a work area. The method of FIG. 10 is generally consistent with the bias error reduction aspect of FIG. 9, except the method of FIG. 10 goes into greater detail with respect to reduction of error associated with bias delay. The method of FIG. 10 begins in step S200.

In step S200, a first transceiver 10 or first receiver determines a first aggregate elapsed time between the transmission of the first transmission signal to a first beacon 91 and a return signal from the first beacon 91 to the vehicle with compensation for bias delay associated with at least one of the transmitter 67 and the first beacon 91.

In step S202, a converter 84 or data processing system converts the first aggregate elapsed time into a first position curve in at least two spatial dimensions for vehicle. In one example, the first position curve is expressed as differential data to reflect only a change in the first position curve over time to minimize transmission of data associated with the beacons.

In step S204, a second transceiver 12 or second receiver determines a second aggregate elapsed time between the transmission of the first transmission signal to a second beacon 92 and receipt of a return signal from the second beacon 92 to the vehicle with compensation for bias delay associated with at least one of the transmitter 67 and the second beacon 92.

In step S206, a converter 84 or data processing system converts the second aggregate elapsed time into a second position curve in at least two spatial dimensions for vehicle. In one example, the second position curve is expressed as differential data to reflect only a change in the second position curve over time to minimize the transmission of data associated with the beacons.

In step S208, a third receiver or third transceiver 93 determines a third aggregate elapsed time between the transmission of the first transmission signal to a third beacon 93 and receipt of a return signal from the third beacon 93 to the vehicle with compensation for bias delay associated with at least one of the transmitter 67 and the third beacon 93.

In step S210, a converter 84 or data processing system converts the third aggregate elapsed time into a third position curve in at least two spatial dimensions for vehicle. In one example, the third position curve is expressed as differential data to reflect only a change in the third position over time to minimize the transmission of data associated with the beacons In step S212, an estimator 80 estimates a position of the vehicle at a confluence or intersection of the first position curve, the second position curve, and the third position curve. The estimation of step S212 may be carried out in accordance with various techniques, which may be applied alternately and cumulatively.

In accordance with a first technique, the estimating comprises assigning an approximately equal weight to the first position curve, the second position curve, and the third position curve to estimate the position of the vehicle.

In accordance with a second technique, the estimating comprises assigning differential weights to the first position curve, the second position curve, and the third position curve based on at least one probability density function for the first position curve, the second position curve and the third position curve to estimate the position of the vehicle.

In accordance with a third technique, the estimating comprises collecting a series of first position curves and averaging the series of first position curves over time; collecting a series of second position curves and averaging the series of first position curves over time; and collecting a series of third position curves and averaging the series of position curves over time to estimate the position of the vehicle.

In accordance with a fourth technique, the estimating comprises collecting a series of first position curves and fitting the first position curves to a generally linear progression over time, collecting a series of second position curves and fitting the second position curves to a generally linear progression over time, collecting a series of third position curves and fitting the third position curves to a generally linear progression over time in accordance with at least one of a least squares approach and a weighted least squares approach.

Figure 11:
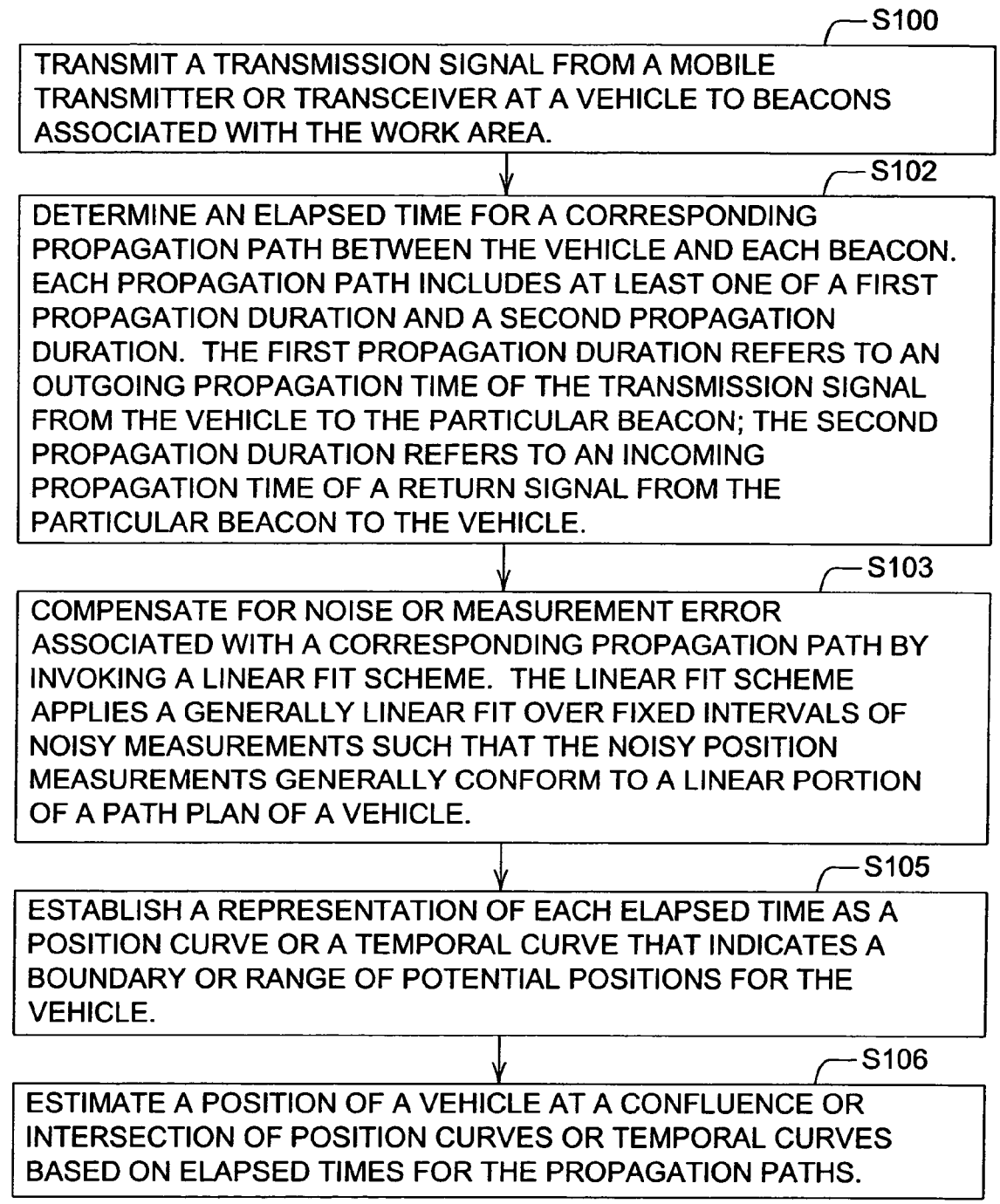
FIG. 11 is a flow chart of yet another method for determining a position of a vehicle with compensation for noise or measurement error.

The method of FIG. 11 is similar to the method of FIG. 8, except the method of FIG. 11 replaces step S104 with step S103. Like reference numbers in FIG. 8 and FIG. 11 indicate like elements.

In step S103, the compensator 82 compensates for noise or measurement error associated with a corresponding propagation path by invoking a linear fit scheme. The linear fit scheme applies a generally linear fit over fixed intervals of noisy measurements of elapsed times, such that the noisy measurements generally conform to a linear portion of a path plan of a vehicle.

For example, a compensator 82 or estimator 80 applies an averaging or a linear fit over fixed intervals of noisy measurements. A linear fit may be applied in accordance with a least squares method or a weighted least squares method. The linear fit is most useful where the vehicle is intended to follow a generally linear spatial path over a time sequence of interest. A path planning module 29 may provide a path plan that provides information for the linear fit.

For example, the least squares estimation may apply calculus equations to estimate the parameter values of a linear model (e.g., a line equation) that minimize the sum of the squared deviations between the observed values (e.g., measurements) and at least a portion of the linear model.

If the line equation is y=mx+b, where m is the estimated slope to be optimized and b is the estimated y axis intercept (of the line) to be optimized, where the x axis and y axis are perpendicular to each other, then the least squares estimates for the parameter values are $$m = \frac{\sum_{i=1}^{n}(x_i - \bar{x})(y_i - \bar{y})}{\sum_{i=1}^{n}(x_i - \bar{x})^2}$$

and $b=\bar{y}-m\bar{x}$, where the bar over the x and y indicate an arithmetic mean value of x and y, respectively, where n is the total number of measurement values averaged, values of $x_i$ are the predictor variables, and i is a measurement value which ranges from 1 to n, where n is positive whole number.

After step S103, the method continues with step S106, which has already been described in detail in conjunction with FIG. 8.

Figure 12:
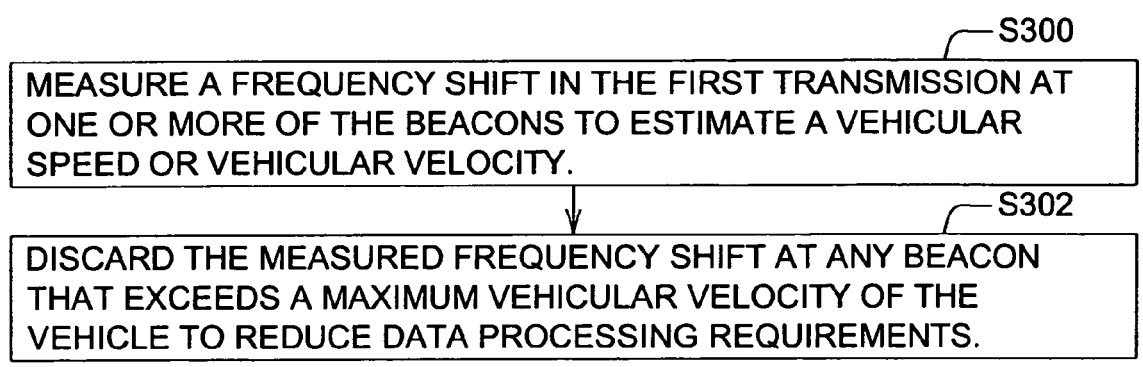
FIG. 12 is a flow chart of a method for determining velocity data for a vehicle that may be applied to any of the methods of FIG. 8 through 10, inclusive.

The method of FIG. 12 may follow the method of FIG. 8, FIG. 9, FIG. 10 or FIG. 11, for example. The method of FIG. 12 begins in step S300.

In step S300, a detector 94 measures a frequency shift in the first transmission at one or more of the beacons to estimate a vehicular speed or vehicular velocity. For example, a Doppler radar detector measures the frequency shift to estimate a vehicular speed or change in direction based on a shift in the frequency transmitted by a mobile transmitter or mobile transceiver of the vehicle electronics 16.

In step S302, a data processor 20 or filtering module discards measured frequency shifts at any beacon that exceed a maximum vehicular velocity of the vehicle to reduce data processing requirements of the data processor 20 or the data processing system in the receiver module (66 or 166). The maximum vehicular velocity may be imposed by the path planning module 29, physical constraints of the vehicle (e.g., engine horse-power, gear ratios of the drive-train, and tire diameter), or by user preferences entered via the user interface 86. The maximum vehicular velocity may be expressed in kilometers per hour, miles per hour, or otherwise.

Having described the preferred embodiment, it will become apparent that various modifications can be made without departing from the scope of the invention as defined in the accompanying claims.

The invention claimed is:

1. A method for determining the position of a vehicle, the method comprising:

transmitting a first transmission signal from a transmitter at a vehicle toward three or more beacons associated with a work area;

determining a first aggregate elapsed time between the transmission of the first transmission signal to a first beacon and a return signal from the first beacon to the vehicle with compensation for a bias delay associated with the transmitter and compensation for a first bias delay associated with the first beacon;

converting the first aggregate elapsed time into a first position curve in at least two spatial dimensions for vehicle;

determining a second aggregate elapsed time between the transmission of the first transmission signal to a second beacon and a return signal from the second beacon to the vehicle with compensation for the bias delay associated with the transmitter and compensation for a second bias delay associated with the second beacon;

converting the second aggregate elapsed time into a second position curve in at least two spatial dimensions for vehicle;

determining a third aggregate elapsed time between the transmission of the first transmission signal to a third beacon and a return signal from the third beacon to the vehicle with compensation for the bias delay associated with the transmitter and compensation for a third bias delay associated with the third beacon;

converting the third aggregate elapsed time into a third position curve in at least two spatial dimensions for vehicle; and estimating a position of the vehicle at a confluence or intersection of the first position curve, the second position curve, and the third position curve.

2. The method according to claim 1 wherein the estimating comprises assigning an approximately equal weight to the first position curve, the second position curve, and the third position curve to estimate the position of the vehicle.

3. The method according to claim 1 wherein the estimating comprises assigning differential weights to the first position curve, the second position curve, and the third position curve based on at least one probability density function for the first position curve, the second position curve and the third position curve to estimate the position of the vehicle.

4. The method according to claim 1 wherein the estimating comprises collecting a series of first position curves and averaging the series of first position curves over time; collecting a series of second position curves and averaging the series of first position curves over time; and collecting a series of third position curves and averaging the series of position curves over time to estimate the position of the vehicle.

5. The method according to claim 1 wherein the estimating comprises collecting a series of first position curves and fitting the first position curves to a generally linear progression over time, collecting a series of second position curves and fitting the second position curves to a generally linear progression over time, collecting a series of third position curves and fitting the third position curves to a generally linear progression over time in accordance with at least one of a least squares approach and a weighted least squares approach.

6. The method according to claim 1 wherein the first position curve is expressed as differential data to reflect only a change in the first position curve over time to minimize transmission of data associated with the beacons; the second position curve is expressed as differential data to reflect only a change in the second position curve over time to minimize the transmission of data associated with the beacons; the third position curve is expressed as differential data to reflect only a change in the third position curve over time to minimize the transmission of data associated with the beacons.

7. The method according to claim 6 wherein the differential data is transmitted from one beacon to another or between one beacon and the vehicle over a subcarrier channel associated with the beacons.

8. The method according to claim 6 wherein the differential data comprises an output of a radio frequency ranging system.

9. The method according to claim 1 further comprising:

measuring a frequency shift in the first transmission at one or more of the beacons to estimate a vehicular speed or vehicular velocity; and discarding measured frequency shifts at any beacon that exceed a maximum vehicular velocity of the vehicle to reduce data processing requirements.

10. A system for determining the position of a vehicle, the system comprising:

a first transmitter for transmitting a first transmission signal from a transmitter at a vehicle toward three or more beacons associated with a work area;

a time estimator for determining a first aggregate elapsed time between the transmission of the first transmission signal to a first beacon and a return signal from the first beacon to the vehicle, a second aggregate elapsed time between the transmission of the first transmission signal to a second beacon and a return signal from the second beacon to the vehicle, a third aggregate elapsed time between the transmission of the first transmission signal to a third beacon and a return signal from the third beacon to the vehicle;

a bias compensator for compensation for bias delay associated with the transmitter, a first bias delay associated with the first beacon, a second bias delay associated with the second beacon, and a third bias delay associated with the third beacon;

a converter for converting the first aggregate elapsed time into a first position curve in at least two spatial dimensions for vehicle, the second aggregate elapsed time into a second position curve in at least two spatial dimensions for vehicle, and the third aggregate elapsed time into a third position curve in at least two spatial dimensions for vehicle; and a data processor for estimating a position of the vehicle at a confluence or intersection of the first position curve, the second position curve, and the third position curve.

11. The system according to claim 10 wherein the data processor assigns an approximately equal weight to the first position curve, the second position curve, and the third position curve to estimate the position of the vehicle.

12. The system according to claim 10 wherein the data processor assigns differential weights to the first position curve, the second position curve, and the third position curve based on at least one probability density function for the first position curve, the second position curve and the third position curve to estimate the position of the vehicle.

13. The system according to claim 10 wherein the data processor collects a series of first position curves and averages the series of first position curves over time; collects a series of second position curves and averages the series of first position curves over time; and collects a series of third position curves and averages the series of position curves over time to estimate the position of the vehicle.

14. The system according to claim 10 wherein the data processor collects a series of first position curves and fits the first position curves to a generally linear progression over time, collects a series of second position curves and fits the second position curves to a generally linear progression over time, collects a series of third position curves and fits the third position curves to a generally linear progression over time in accordance with at least one of a least squares approach and a weighted least squares approach.

15. The system according to claim 10 wherein the first position curve is expressed as differential data to reflect only a change in the first position curve over time to minimize transmission of data associated with the beacons; the second position curve is expressed as differential data to reflect only a change in the second position curve over time to minimize the transmission of data associated with the beacons; the third position curve is expressed as differential data to reflect only a change in the third position over time to minimize the transmission of data associated with the beacons.

16. The system according to claim 15 wherein the differential data is transmitted from one beacon to another or between one beacon and the vehicle over a subcarrier channel associated with the beacons.

17. The system according to claim 15 wherein the differential data comprises an output of a radio frequency ranging system.

18. The system according to claim 10 further comprising:
a detector for measuring a frequency shift in the first transmission at one or more of the beacons to estimate a vehicular speed or vehicular velocity; and
a filtering module for discarding measured frequency shifts at any beacon that exceed a maximum vehicular velocity of the vehicle to reduce data processing requirements.

* * * * *